US012329721B1

(12) United States Patent
Zhou et al.

(10) Patent No.: US 12,329,721 B1
(45) Date of Patent: Jun. 17, 2025

(54) SYSTEM AND METHOD FOR ASEPTICALLY TRANSFERRING FLUID

(71) Applicant: Applied Cells Inc., Santa Clara, CA (US)

(72) Inventors: Yuchen Zhou, San Jose, CA (US); Fengxiang Pang, Qinhuangdao (CN); Jinlong Fan, Qinhuangdao (CN); Xinglong Wang, Qinhuangdao (CN)

(73) Assignee: Applied Cells Inc., Santa Clara, CA (US)

( * ) Notice: Subject to any disclaimer, the term of this patent is extended or adjusted under 35 U.S.C. 154(b) by 0 days.

(21) Appl. No.: 18/991,162

(22) Filed: Dec. 20, 2024

(51) Int. Cl.
*A61J 1/20* (2006.01)

(52) U.S. Cl.
CPC ............. *A61J 1/2096* (2013.01); *A61J 1/201* (2015.05)

(58) Field of Classification Search
CPC ............. A61J 1/10; A61J 1/2096; A61J 1/201
See application file for complete search history.

(56) References Cited

U.S. PATENT DOCUMENTS 3,872,730 A * 3/1975 Ringrose ............ G01N 35/1079 73/864.23
7,418,981 B2 9/2008 Baker et al.
7,900,658 B2 3/2011 Osborne et al.
9,456,956 B1 * 10/2016 Webster .................. A61L 2/081
9,597,260 B2 3/2017 Ivosevic et al.
9,925,333 B2 3/2018 Hooven et al.
10,182,969 B2 1/2019 Arnott et al.
10,695,490 B2 6/2020 Perazzo et al.
11,759,572 B2 9/2023 Genosar
2009/0306621 A1 * 12/2009 Thome, Jr. .......... A61M 39/223 604/82
2013/0225903 A1 * 8/2013 Franci .................. A61N 5/1007 600/4
2022/0370289 A1 * 11/2022 McLoughlin ........... A61J 3/002
2024/0366476 A1 * 11/2024 Hadad ................... A61J 1/2062
2024/0423873 A1 * 12/2024 Thorne, Jr. ............... A61J 1/22

* cited by examiner

*Primary Examiner* — Timothy P. Kelly
(74) *Attorney, Agent, or Firm* — Bing K. Yen

(57) ABSTRACT

A system for aseptically transferring a liquid substance comprises a sterilized vial filled with the liquid substance and sealed with a sterilized septum; a sterilized fluidic assembly including a piercing member including therein first and second channels and having a tip end that operably punctures the sterilized septum, the first and second channels having first and second channel openings at the tip end; a manual air pump; an inlet line fluidically connects the manual air pump to the first channel of the piercing member; and an outlet line fluidically connected to the second channel of the piercing member at one end and hermetically sealed at the other end; and a sterilized pouch enclosing and hermetically sealing the sterilized vial and the piercing member and operably allowing the piercing member to puncture the sterilized septum when the piercing member is manually pushed from the exterior of the sterilized pouch.

20 Claims, 12 Drawing Sheets

SYSTEM AND METHOD FOR ASEPTICALLY TRANSFERRING FLUID

BACKGROUND OF THE INVENTION

The present invention relates generally to a system and method for aseptically transferring fluid, and more particularly but not exclusively to a system and method for aseptically transferring a liquid substance from a vial to a receiving container.

Contamination during manufacturing of biopharmaceutical products may have serious health effects on patients, especially biologics that are introduced to the patients by injection because this mode of drug delivery may bypass the body's natural defenses. Accordingly, biologics are manufactured in aseptic processing facilities that require cleanrooms with stringent controls and close monitoring to minimize the risks of microbial and pyrogen contamination. The strict requirements on sterility and cleanliness during manufacturing have prompted the biopharmaceutical industry to increasingly use closed processing systems equipped with single-use technologies. The use of such closed processing systems to manufacture biologics, however, still requires aseptic transfer of ingredients from containers, such as common glass vials sealed by septa, to the processing systems. Glass vials are considered to be standard containers in the pharmaceutical industry owing to their extensive clinical history and long term stability with various drugs. The transfer process of ingredients from vials to closed processing systems may still need to be performed in a cleanroom with a stringent sterility and cleanliness standard, which will inevitably inflate the manufacturing cost of biologics.

For the foregoing reason, there is a need for a system and method for aseptically transferring a liquid substance from a vial to a receiving container of a processing system or equipment.

SUMMARY OF THE INVENTION

The present invention is directed to a system that satisfies this need. A system having features of the present invention for aseptically transferring a liquid substance comprises a sterilized vial filled with the liquid substance and sealed with a sterilized septum; a sterilized fluidic assembly comprising a piercing member including therein first and second channels and having a tip end that operably punctures the sterilized septum, the first and second channels having first and second channel openings at the tip end of the piercing member; a manual air pump; an inlet line fluidically connects the manual air pump to the first channel of the piercing member; and an outlet line fluidically connected to the second channel of the piercing member at one end and hermetically sealed at the other end; and a sterilized pouch enclosing and hermetically sealing the sterilized vial and the piercing member and operably allowing the piercing member to puncture the sterilized septum without breaching the sterilized pouch when one of the sterilized vial and the piercing member is manually pushed against the other one of the sterilized vial and the piercing member from an exterior of the sterilized pouch.

According to another aspect of the present invention, a method having features of the present invention for manufacturing a system for aseptically transferring a liquid substance comprises the steps of sterilizing a vial and a septum; aseptically filling the sterilized vial with the liquid substance and sealing the sterilized vial with the sterilized septum; providing a fluidic assembly that includes a piercing member including therein first and second channels and having a tip end that operably punctures the sterilized septum, the first and second channels having first and second channel openings at the tip end of the piercing member; a manual air pump; an inlet line fluidically connects the manual air pump to the first channel of the piercing member; and an outlet line fluidically connected to the second channel of the piercing member at one end and hermetically sealed at the other end; sterilizing the fluidic assembly; and assembling the vial and the fluidic assembly and hermetically sealing the vial and the piercing member in a sterilized pouch in an aseptic environment, wherein the sterilized pouch allows the piercing member to puncture the sterilized septum without breaching the sterilized pouch when one of the sterilized vial and the piercing member is manually pushed against the other one of the sterilized vial and the piercing member from an exterior of the sterilized pouch.

According to still another aspect of the present invention, a method having features of the present invention for aseptically transferring a liquid substance comprises the steps of providing a transfer system including a sterilized vial filled with the liquid substance and sealed with a sterilized septum; a sterilized fluidic assembly including a piercing member including therein first and second channels and having a tip end that operably punctures the sterilized septum, the first and second channels having first and second channel openings at the tip end of the piercing member; a manual air pump filled with sufficient air to propel all of the liquid substance out of the sterilized vial; an inlet line fluidically connects the manual air pump to the first channel of the piercing member; and an outlet line fluidically connected to the second channel of the piercing member at one end and hermetically sealed at the other end; and a sterilized pouch enclosing and hermetically sealing the sterilized vial and the piercing member; aseptically connecting the outlet line to an external line for receiving the liquid substance; puncturing the sterilized septum with the piercing member by manually pushing one of the sterilized vial and the piercing member against the other one of the sterilized vial and the piercing member from an exterior of the sterilized pouch without breaching the sterilized pouch, thereby aseptically establishing fluidic connections between the sterilized vial and the inlet and outlet lines; and expelling air from the manual air pump into the sterilized vial disposed in an inverted orientation to propel the liquid substance in the sterilized vial through the outlet line and into the external line.

BRIEF DESCRIPTION OF DRAWINGS

These and other features, aspects, and advantages of the present invention will become better understood with regard to the following description, appended claims, and accompanying drawings where:

For purposes of clarity and brevity, like elements and components will bear the same designations and numbering throughout the Figures, which are not necessarily drawn to scale.

DETAILED DESCRIPTION OF THE INVENTION

Figure 1:
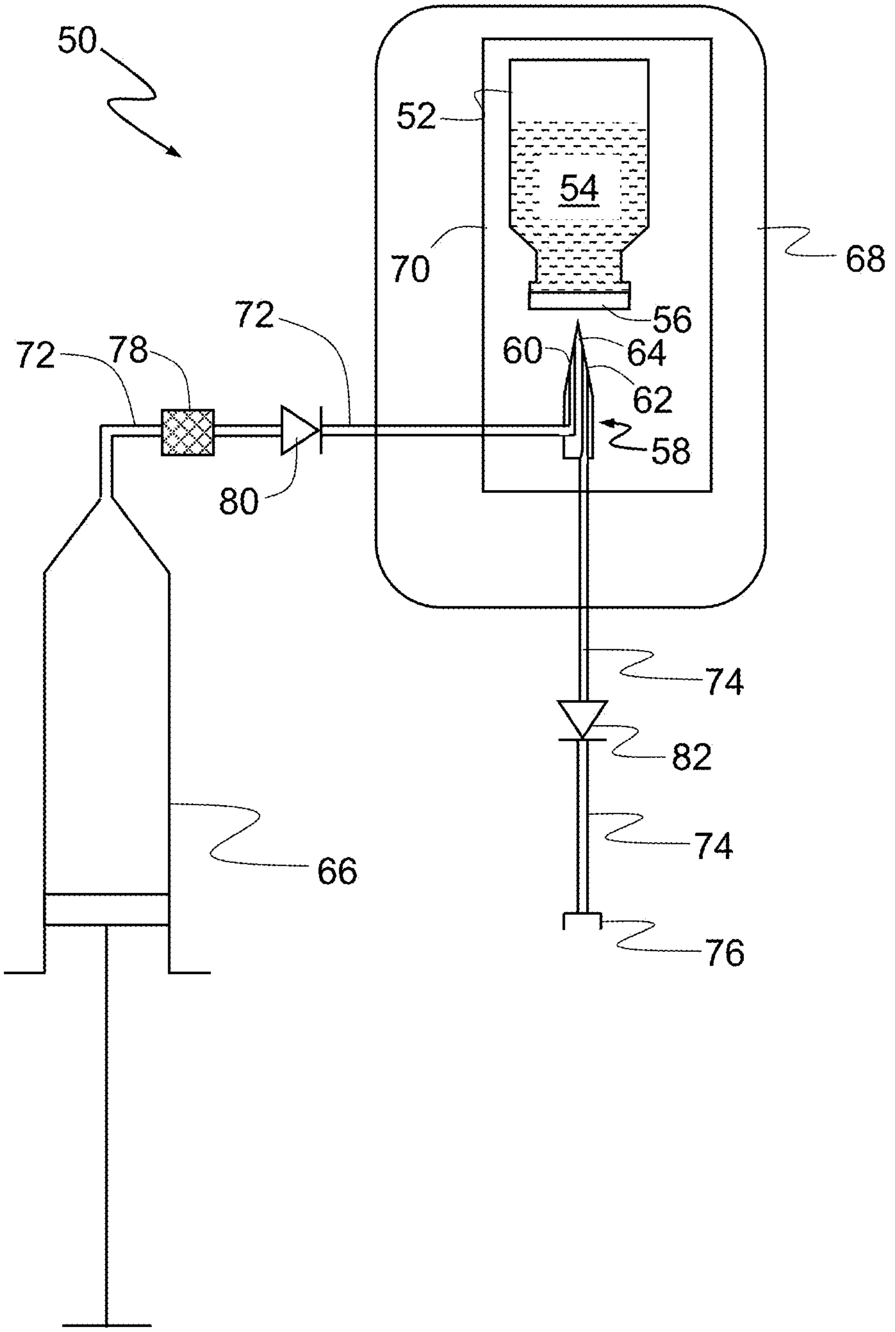
FIG. 1 illustrates a system for aseptically transferring a liquid substance from a sterilized vial to a receiving container in accordance with an embodiment of the present invention.

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously, except where the context excludes that possibility, and the method can include one or more other steps which are carried out before any of the defined steps, between two of the defined steps, or after all the defined steps, except where the context excludes that possibility.

The term "biological objects" as used herein includes cells, bacteria, viruses, molecules, particles including RNA and DNA, cell cluster, bacteria cluster, molecule cluster, and particle cluster.

The term "biological sample" as used herein includes blood, body fluid, tissue extracted from any part of the body, bone marrow, hair, nail, bone, tooth, liquid and solid from bodily discharge, or surface swab from any part of body. "Fluid sample," or "sample fluid," or "liquid sample," or "sample solution" may include a biological sample in its original liquid form, biological objects being dissolved or dispersed in a buffer fluid, or a biological sample dissociated from its original non-liquid form and dispersed in a buffer fluid. A buffer fluid is a liquid into which biological objects may be dissolved or dispersed without introducing contaminants or unwanted biological objects. Biological objects and biological sample may be obtained from human or animal. Biological objects may also be obtained from plants and environment including air, water, and soil. A fluid sample may contain various types of magnetic or optical labels, or one or more chemical reagents that may be added during various process steps.

The term "sample flow rate" or "flow rate" is used herein to describe the volume amount of a fluid flowing through a cross section of a channel, a conduit, a fluidic part, a fluidic path, or a fluidic line in a unit time.

The term "at least" followed by a number is used herein to denote the start of a range beginning with that number, which may be a range having an upper limit or no upper limit, depending on the variable being defined. For example, "at least 1" means 1 or more than 1. The term "at most" followed by a number is used herein to denote the end of a range ending with that number, which may be a range having 1 or 0 as its lower limit, or a range having no lower limit, depending upon the variable being defined. For example, "at most 4" means 4 or less than 4, and "at most 40%" means 40% or less than 40%. When, in this specification, a range is given as "a first number to a second number" or "a first number-a second number," this means a range whose lower limit is the first number and whose upper limit is the second number. For example, "25 to 100 nm" means a range whose lower limit is 25 nm and whose upper limit is 100 nm.

Directional terms, such as "front," "back," "top," "bottom," and the like, may be used with reference to the orientation of the illustrated figure. Spatially relative terms, such as "beneath," "below," "under," "lower," "upper," "above," etc., may be used herein to describe one element's relationship to another element(s) as illustrated in the figure. Since articles and elements can be positioned in a number of different orientations, these terms are intended for illustration purposes and in no way limit the invention, except where the context excludes that possibility.

FIG. 1 illustrates a system for aseptically transferring a liquid substance from a vial to a receiving container in accordance with an embodiment of the present invention. The system 50 comprises a sterilized vial 52 aseptically filled with a liquid substance 54 and sealed with a sterilized septum 56 at its mouth, a sterilized fluidic assembly that includes a piercing member 58 including therein first and second lumens or channels 60, 62 and having a tip end 64 that can operably pierce the sterilized septum 56 to establish fluidic communications between the chamber of the sterilized vial 52 and the first and second channels 60, 62, a manual air pump 66 for pumping air into the sterilized vial 52, an inlet line 72 fluidically connects the manual air pump 66 to the first channel 60 of the piercing member 58, and an outlet line 74 connected to the second channel 62 of the piercing member 58 at one end and hermetically sealed at the other end, and a sterilized pliable container 68 enclosing and hermetically sealing the sterilized vial 52 and the piercing member 58 and operably allowing the piercing member 58 to puncture through the sterilized septum 56 without breaching the sterilized pliable container 68 when one of the sterilized vial 52 and the piercing member 58 is manually pushed against the other one of the sterilized vial 52 and the piercing member 58 from the exterior of the sterilized pliable container 68.

The first and second channels 60, 62 have first and second channel openings at the tip end 64 of the piercing member

58, respectively. The other ends the first and second channels 60, 62 are connected to the inlet and outlet lines 72, 74, respectively. When the piercing member 58 punctures through the septum 56 at the time of use, the first and second channel openings at the tip end 64 will be exposed to the interior or chamber of the sterilized vial 52, thereby fluidically connecting the interior or chamber of the sterilized vial 52 to the outlet line 74 and the manual air pump 66 through the inlet line 72.

The system 50 may further comprise a sterilized holder 70, onto which the sterilized vial 52 and the piercing member 58 are mounted. The sterilized holder 70, together with the sterilized vial 52 and the piercing member 58, may be hermetically sealed in the sterilized pliable container 68 and may provide a guiding means or mechanism for the piercing member 58 to puncture the sterilized septum 56 in the sterilized pliable container 68 without breaching the sterilized pliable container 68 when one of the sterilized vial 52 and the piercing member 58 is manually pushed against the other one of the sterilized vial 52 and the piercing member 58 from the exterior of the sterilized pliable container 68.

The fluidic assembly of the system 50 may further comprise an air filter 78 inserted along the inlet line 72 for filtering the air discharged from the manual air pump 66, thereby preserving the sterility of air entering the sterilized vial 52, and/or an optional check valve 80 inserted along the inlet line 72 to prevent the back flow of air to the manual air pump 66, and/or another optional check valve 82 inserted along the outlet line 74 to prevent back flow of the liquid substance 54 to the sterilized vial 52 during the transfer operation, and/or additional connectors inserted along the inlet and outlet lines 72, 74.

The sterilized vial 52 may be made of glass and sealed by the sterilized septum 56 comprising an elastomeric material, such as but not limited to polytetrafluoroethylene (PTFE) or PTFE/silicone/PTFE laminates. The sterilized septum 56 may be held in place by a retainer (not shown) extending around the neck of the sterilized vial 52, and particularly around a collar or flange formed on the neck of the sterilized vial 52. The retainer may also extend partially over the exterior surface of the sterilized septum 56 to leave an exposed region of the sterilized septum 56 for access to the interior or chamber of the sterilized vial 52 with the piercing member 58. The sterilized vial 52 itself without the liquid substance 54 therein and the sterilized septum 56 may be sterilized by any suitable sterilization method, such as but not limited to steam sterilization, chemical sterilization, e-beam sterilization, or gamma ray radiation sterilization, prior to filling the sterilized vial 52 with the liquid substance 54 under an aseptic or sterile condition to prevent potential contamination.

The liquid substance 54 may comprise any substance or ingredient used in manufacturing of biologics, such as but not limited to water, buffer, cell culture media, serum, freeze media, transduction enhancer (e.g., peptide, polymer), protein (e.g., IL2, IL-15, or antibody), magnetic beads-antibody conjugates for cell sorting (i.e., magnetic labels), lipid nano-particles, plasmids, virus, cells, extravascular suspension, or any combination thereof.

The piercing member 58 of the sterilized fluidic assembly may be made of a metallic, ceramic, or polymeric material that is sufficiently hard for puncturing through the elastomeric septum 56. For example and without limitation, the piercing member 58 may be made of stainless steel. The inlet line 72 and outlet line 74 of the sterilized fluidic assembly may be made of a pliable/flexible thermoplastic material, such as but not limited to polyvinyl chloride (PVC). The free end of the outlet line 74 may be hermetically sealed by heat-induced welding. Prior to transferring the liquid substance 54 out of the sterilized vial 52, the free end of the outlet line 74 may be aseptically welded to another line connected to a receiving container (not shown), thereby aseptically transferring the liquid substance 54 to the receiving container. Alternatively, the free end of the outlet line 74 may be hermetically sealed by a male or female half of an aseptic connector 76, which is then connected to the opposite half of the aseptic connector attached to another line at the time of use. The male and female halves of the aseptic connector 76 each contain a sterile membrane, which is removed when the male and female halves are joined together, thereby forming a closed and sterile fluid path between the lines at the opposite ends of the aseptic connector 76.

The manual air pump 66 of the fluidic assembly may be in the form of a syringe, which includes a barrel and a plunger, or any air bladder device filled with sufficient air to propel substantially all of the liquid substance 54 out of the sterilized vial 52. The syringe or air bladder device may be manually squeezed by hand to push the air therein into the sterilized vial 52, thereby propelling the liquid substance 54 into the outlet line 74. The manual air pump 66 may alternatively be replaced by a portable air pump powered by battery or electricity to inject air into the sterilized vial 52.

The sterilized fluidic assembly, which includes the piercing member 58, the inlet line 72, the manual air pump 66, the outlet line 74, the optional air filter 78, and the optional check valves 80, 82 may be sterilized by heat, steam, gamma ray radiation, or other suitable means.

The sterilized pliable container 68 may be in the form of a bag or pouch and is sufficiently supple and resilient to allow the piercing member 58 to puncture the septum 56 by manual manipulation from outside of the sterilized pliable container 68 without breaking or tearing the sterilized pliable container 68, thereby ensuring the interior of the sterilized pliable container 68 and all fluidic paths in the sterilized fluidic assembly remain sterile after establishing fluidic communication between the sterilized vial 52 and the inlet and outlet lines 72, 74. The sterilized pliable container 68 in the form of bag or pouch may be made of any suitable polymeric material, such as but not limited to PVC, and may be sterilized by ethylene oxide, alcohol, gamma ray radiation, or other suitable methods. The sterilized pliable container 68 may enclose at least the sterilized vial 52, the piercing member 58, portions of the inlet and outlet lines 72, 74 connected to the piercing member 58, and the sterilized holder 70, if any. If the piercing member 58 is designed to be pushed against the sterilized vial 52 at the time of use, then there may be some slack in the inlet and outlet lines 72, 74 inside the sterilized pliable container 68 to accommodate the movement of the piercing member 58. Other fluidic components, such as but not limited to the manual air pump 66, the optional air filter 78, and the optional check valves 80, 82, may also be hermetically sealed within the sterilized pliable container 68. The free end of the outlet line 74, which is welded close or terminated with a male or female portion of the aseptic connector 76, will be aseptically connected to an external line at the time of use and therefore should not be sealed in the sterilized pliable container 68. The sterilized vial 52, the piercing member 58 of the sterilized fluidic assembly, and the sterilized holder 70, onto which the sterilized vial 52 and the piercing member 58 are separately mounted, may be hermetically sealed in the sterilized pliable container 68 in an aseptic or sterile environment to preserve the sterility of the components sealed therein. The system 50 may be discarded after the liquid substance 54 is transferred from the sterilized vial 52 to the receiving container (i.e. single-use application).

Figure 2:
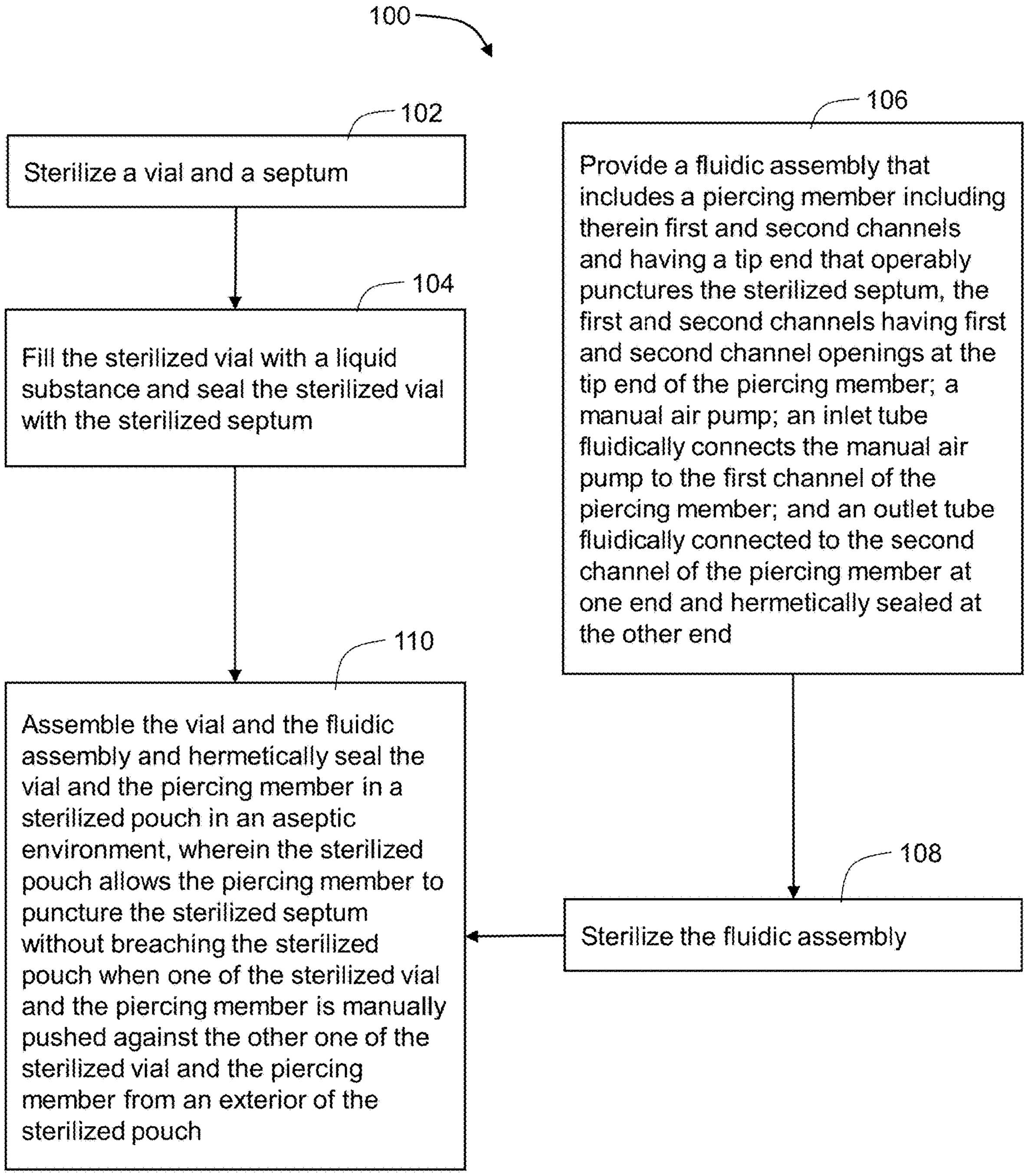
FIG. 2 is a flow diagram illustrating selected steps for fabricating the system for aseptically transferring a liquid substance in accordance with an embodiment of the present invention.

Manufacturing of the system 50 will now be described with reference to FIG. 1 and the flow diagram of FIG. 2, which illustrates selected steps 100 for fabricating the system 50 for aseptically transferring a liquid substance in accordance with an embodiment of the present invention. The process begins at step 102 by sterilizing a vial 52 and a septum 56. After sterilizing the vial 52 and the septum 56, the sterilized vial 52 is aseptically filled with the liquid substance 54 and sealed with the sterilized vial 56 in an aseptic or sterile environment at step 104.

At step 106, a fluidic assembly is provided that includes a piercing member 58 including therein first and second channels 60, 62 and having a tip end 64 that can operably puncture through the sterilized septum 56, the first and second channels having first and second channel openings at the tip end 64 of the piercing member 58; a manual air pump 66; an inlet line 72 fluidically connects the manual air pump 66 to the first channel 60 of the piercing member 58; and an outlet line 74 fluidically connected to the second channel 62 of the piercing member 58 at one end and hermetically sealed at the other end, as described above with reference to FIG. 1. The fluidic assembly may further include an air filter 78 inserted along the inlet line 72 for filtering the air discharged from the manual air pump 66, and/or an optional check valve 80 inserted along the inlet line 72 to prevent the back flow of air to the manual air pump 66, and/or another optional check valve 82 inserted along the outlet line 74 to prevent back flow of the liquid substance 54 to the sterilized vial 52 during the transfer operation, and/or any additional connectors inserted along the inlet and outlet lines 72, 74. In an embodiment, the manual air pump 66 is a syringe.

After providing the fluidic assembly, the fluidic assembly is sterilized by a suitable means, such as but not limited to heat, steam, or gamma ray radiation, at step 108.

Since the sterilization of the vial 52 is independent of the sterilization of the fluidic assembly, steps 102/104 and steps 106/108 can be carried out in the reversed order (i.e., steps 106/108 and then steps 102/104) or simultaneously.

Next, at step 110, the sterilized vial 52 and the sterilized fluidic assembly are assembled, and the sterilized vial 52 and the piercing member 58 are hermetically sealed in a sterilized pouch 68 in an aseptic or sterile environment. The sterilized pouch 68 allows the piercing member 58 to puncture the sterilized septum 56 without breaching the sterilized pouch 68 when one of the sterilized vial 52 and the piercing member 58 is manually pushed against the other one of the sterilized vial 52 and the piercing member 58 from the exterior of the sterilized pouch 68.

The sterilized vial 52 and the piercing member 58 may be separately mounted on a sterilized holder 70 that provides a guiding mechanism for the piercing member 58 to puncture the sterilized septum 56 of the sterilized vial 52 in the sterilized pouch 68. The sterilized holder 70, together with the sterilized vial 52 and the piercing member 58, may be hermetically sealed in the sterilized pouch 68 at step 110.

Figure 3:
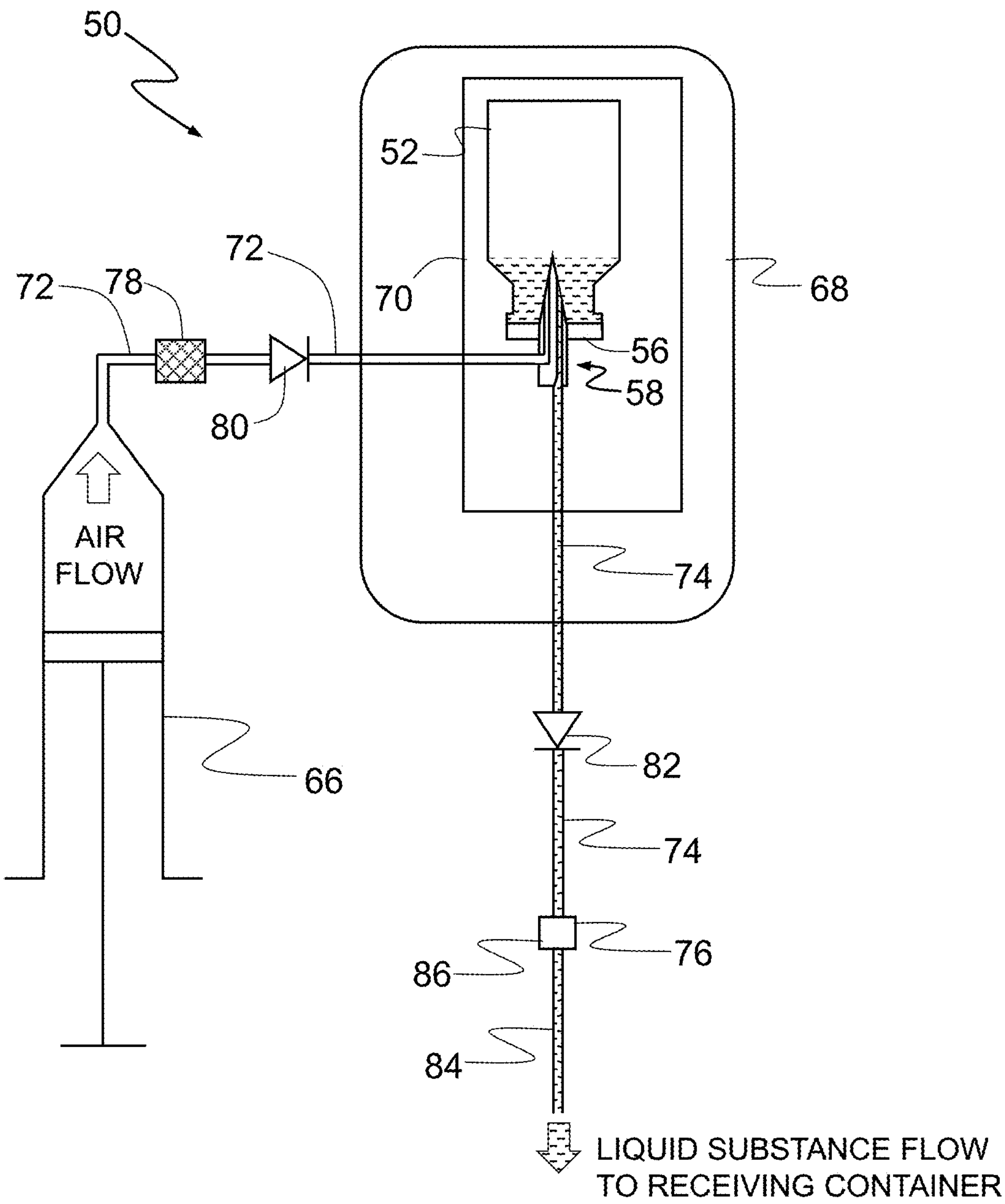
FIG. 3 illustrates operation of a system for aseptically transferring a liquid substance from a sterilized vial to a receiving container in accordance with an embodiment of the present invention.
Figure 4:
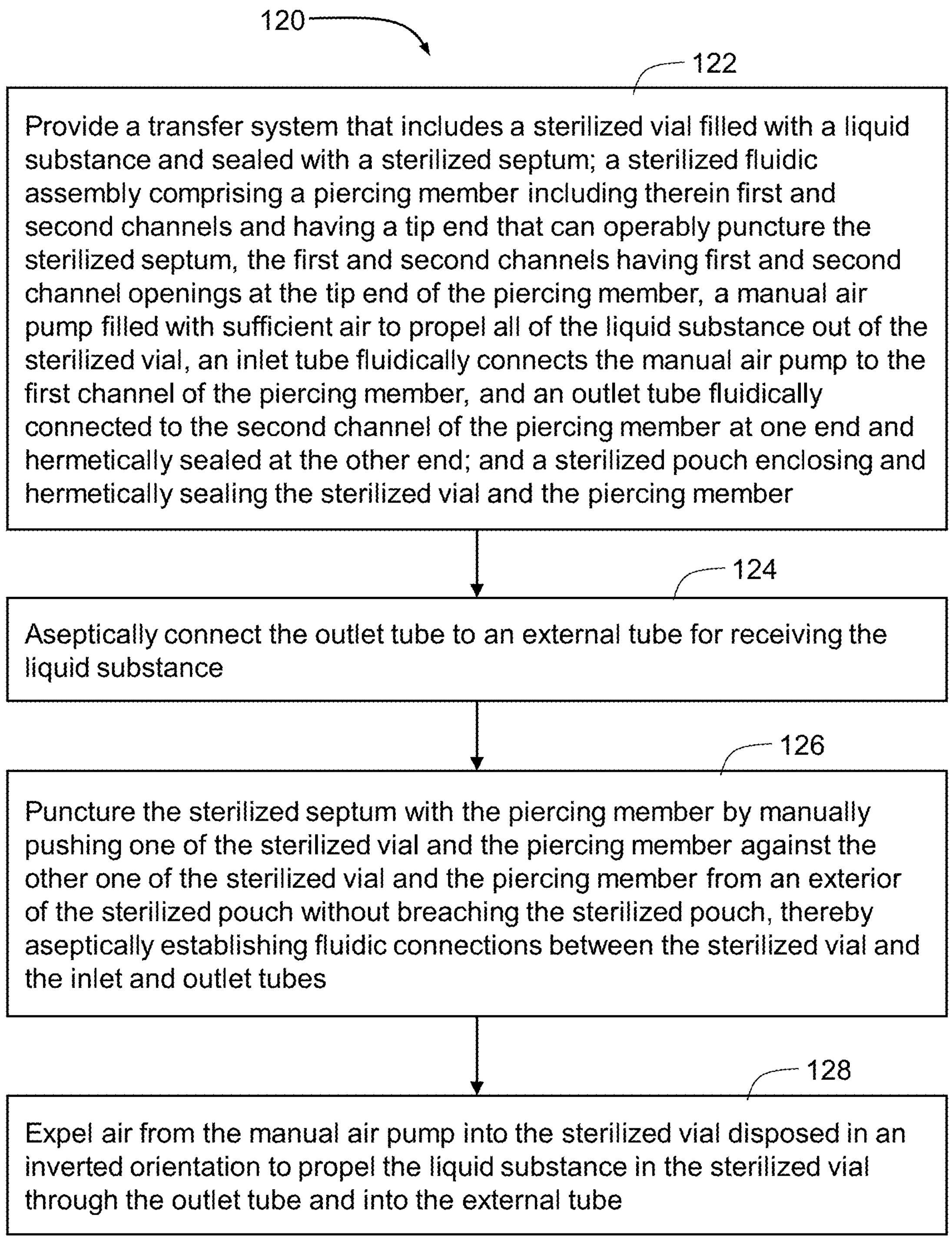
FIG. 4 is a flow diagram illustrating selected steps for operating the system for aseptically transferring a liquid substance in accordance with an embodiment of the present invention.

Operation of the system 50 will now be described with reference to FIGS. 1, 3, and 4. The flow diagram of FIG. 4 illustrates selected steps 120 for using the system 50 to aseptically transfer a liquid substance from a vial in accordance with an embodiment of the present invention. The process begins at step 122 by providing a transfer system 50 that includes a sterilized vial 52 filled with a liquid substance 54 and sealed with a sterilized septum 56; a sterilized fluidic assembly comprising a piercing member 58 including therein first and second channels 60, 62 and having a tip end 64 that can operably puncture through the sterilized septum 56, the first and second channels 60, 62 having first and second channel openings at the tip end 64 of the piercing member 58, a manual air pump 66 filled with sufficient air to propel all of the liquid substance 54 out of the sterilized vial 52, an inlet line 72 fluidically connects the manual air pump 66 to the first channel 60 of the piercing member 58, and an outlet line 74 fluidically connected to the second channel 62 of the piercing member 58 at one end and hermetically sealed at the other end; and a sterilized pouch 68 enclosing and hermetically sealing the sterilized vial 52 and the piercing member 58. In an embodiment, the manual air pump 66 is a syringe.

The system 50 may further include a sterilized holder 70. The sterilized vial 52 and the piercing member 58 may be separately mounted on a sterilized holder 70 that provides a guiding mechanism for the piercing member 58 to puncture the sterilized septum 56 of the sterilized vial 52 in the sterilized pouch 68. The sterilized holder 70, together with the sterilized vial 52 and the piercing member 58, may be hermetically sealed in the sterilized pouch 68. The sterilized holder 70 may be made of any moldable material that has sufficient mechanical rigidity and can withstand the sterilization process, such as but not limited to thermoplastic materials.

Next, at step 124, the outlet line 74 is aseptically connected to an external line 84 for receiving the liquid substance 54. The other end of the external line 84 may be connected to a receiving container (not shown). For the outlet line 74 sealed by thermal welding, this may be carried out by using a commercial tube welder that maintains the sterility of the connection. For the outlet line 74 that uses an aseptic connector, this may be carried out by connecting the male or female half of the aseptic connector 76 attached to the free end of the outlet line 74 to the opposite half of the aseptic connector 76 attached to the external line 84.

At step 126, the sterilized septum 56 is punctured with the piercing member 58 by manually pushing one of the sterilized vial 52 and the piercing member 58 against the other one of the sterilized vial 52 and the piercing member 58 from an exterior of the sterilized pouch 68 without breaching the sterilized pouch 68, thereby aseptically establishing fluidic connections between the sterilized vial 52 and the inlet and outlet lines 72, 74. Steps 124 and 126 may be carried out in the reversed order or simultaneously.

After steps 124 and 126, the manual air pump 66 pushes air into the sterilized vial 52 oriented in an inverted position (i.e., the second channel 62 of the piercing member 58 is submerged in the liquid substance 54) to propel the liquid substance 54 in the sterilized vial 52 through the outlet line 74 and the external line 84 and into the receiving container at step 128. If only a portion of the liquid substance 54 in the sterilized vial 52 needs to be transferred to the receiving container, the sterilized vial 52 may be reoriented in an upright position (i.e., the second channel 62 of the piercing member 58 is not covered by the liquid substance 54) after the portion of the liquid substance 54 has been transferred out of the sterilized vial 52. After the sterilized vial 52 is reoriented in the upright position, the manual air pump 66 may continue to inject air into the sterilized vial 52, thereby pushing the residual liquid substance 54 remained in the outlet line 74 and the external line 84 into the receiving container without further draining the liquid substance 54 remained the sterilized vial 52. In an embodiment, the manual air pump 66 is a syringe.

Figure 5:
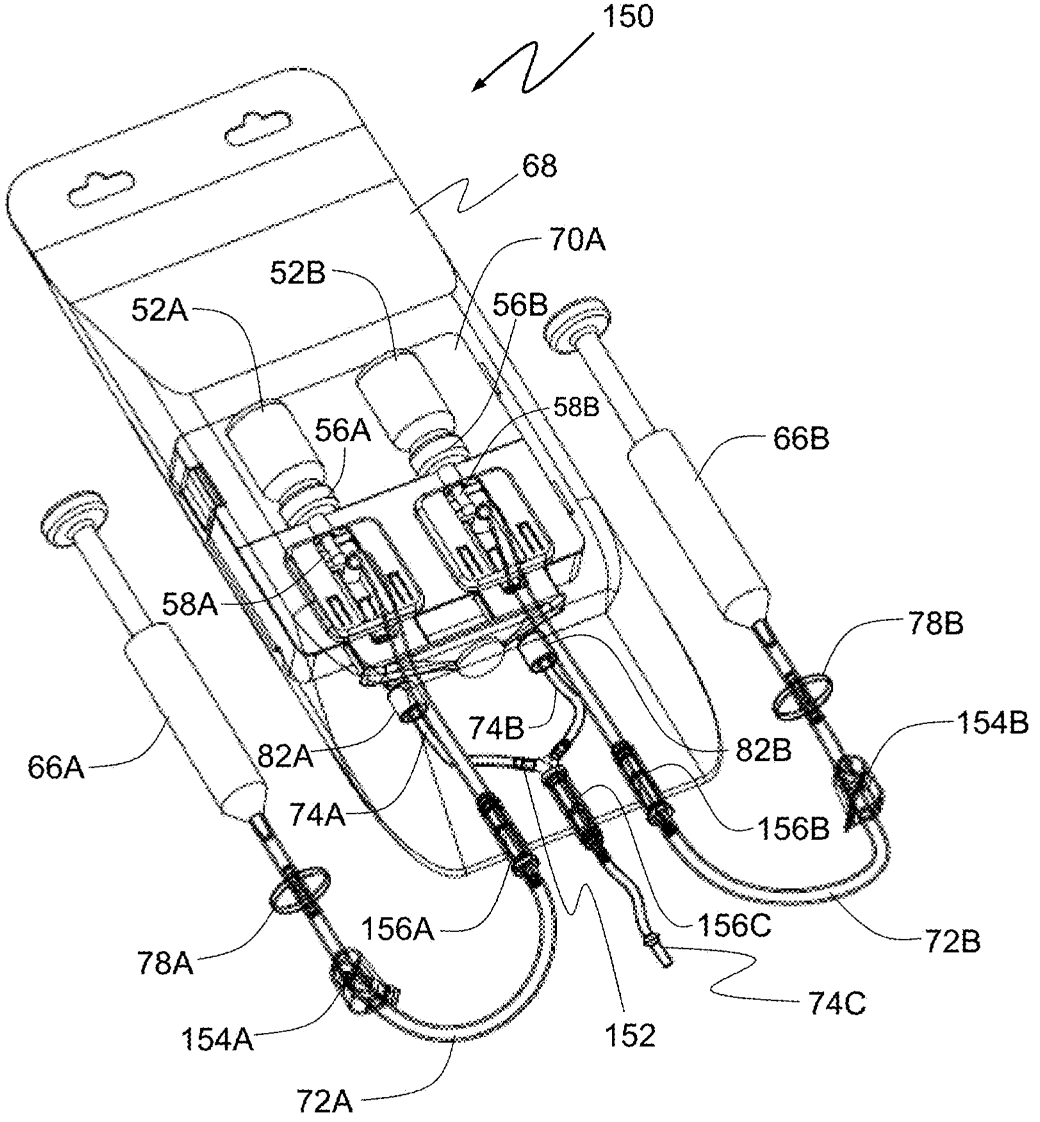
FIG. 5 is a perspective view of an exemplary system for aseptically transferring two liquid substances from a pair of sterilized vials to a receiving container in accordance with an embodiment of the present invention.

The following examples are provided to illustrate, but not limit the invention. FIG. 5 is a perspective view of an exemplary system 150 for aseptically transferring up to two fluid substances from two vials in accordance with an embodiment of the present invention. The system 150 comprises a pair of sterilized vials 52A, 52B filled with respective liquid substances and sealed with sterilized septa 56A, 56B, a sterilized fluidic assembly, a sterilized holder 70A, and a sterilized pouch 68.

Figure 6:
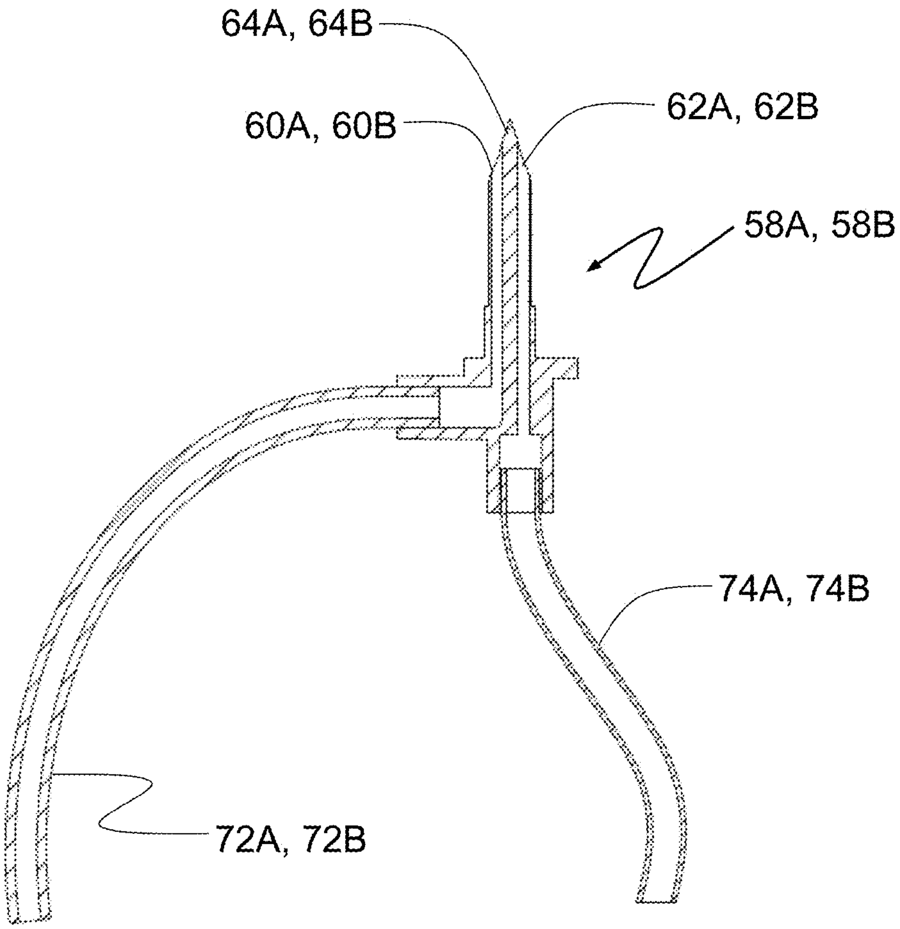
FIG. 6 is a cross-sectional view of the piercing members of the exemplary system shown in FIG. 5.

The sterilized fluidic assembly comprises a pair of piercing members 58A, 58B, each of which includes therein a first channel 60A, 60B and a second channel 62A, 62B and having a tip end 64A, 64B that can operably puncture through the sterilized septum 56A, 56B, as shown in FIG. 6. The first channel 60A, 60B and the second channel 62A, 62B have the first and second channel openings at the tip end 64A, 64B of the piercing member 58A, 58B.

Referring back to FIG. 5, the sterilized fluidic assembly further comprises a pair of manual air pumps 66A, 66B in the form of syringes, a pair of inlet lines 72A, 72B that connect the syringes 66A, 66B to the piercing members 58A, 58B through a pair of pass-through connectors 156A, 156B, and a pair of outlet lines 74A, 74B fluidically connected to the second channels of the piercing member 56A, 56B at one end and an integrated outlet line 74C at the other end through a three-way connector 152 and a pass-through connector 156C. The free end of the integrated outlet line 74C may be hermetically sealed by heat-induced welding. The inlet lines 72A, 72B include in-line air filters 78A, 78B for filtering air expelled from the syringes 66A, 66B and clamps or pinch valves 154A, 154B for regulating the air flow through the inlet lines 72A, 72B. The outlet lines 74A, 74B include check valves 82A, 82B that prevent the back flow of liquid substances.

The sterilized vials 52A, 52B, the sterilized holder 70A, and a part of the sterilized fluidic assembly including the piercing members 58A, 58B, the outlet lines 74A, 74B connected thereto, the check valves 82A, 82B, the three-way connector 152 connected to the outlet lines 74A, 74B, and portions of the inlet lines 72A, 72B are hermetically sealed inside the sterilized pouch 68 to preserve sterility. The inlet lines 72A, 72B fluidically connect the syringes 66A, 66B disposed outside the sterilized pouch 68 to the piercing members 58A, 58B disposed inside the sterilized pouch 68 via the pass-through connectors 156A, 156B. The three-way connector 152 disposed inside the sterilized pouch 68 is connected to one end of the pass-through connector 156C, the other end of which is connected to the integrated outlet line 74C disposed outside the sterilized pouch 68. The pass-through connectors 156A-156C may go through the sealed sterilized pouch 68 along a seam thereof.

Figure 7:
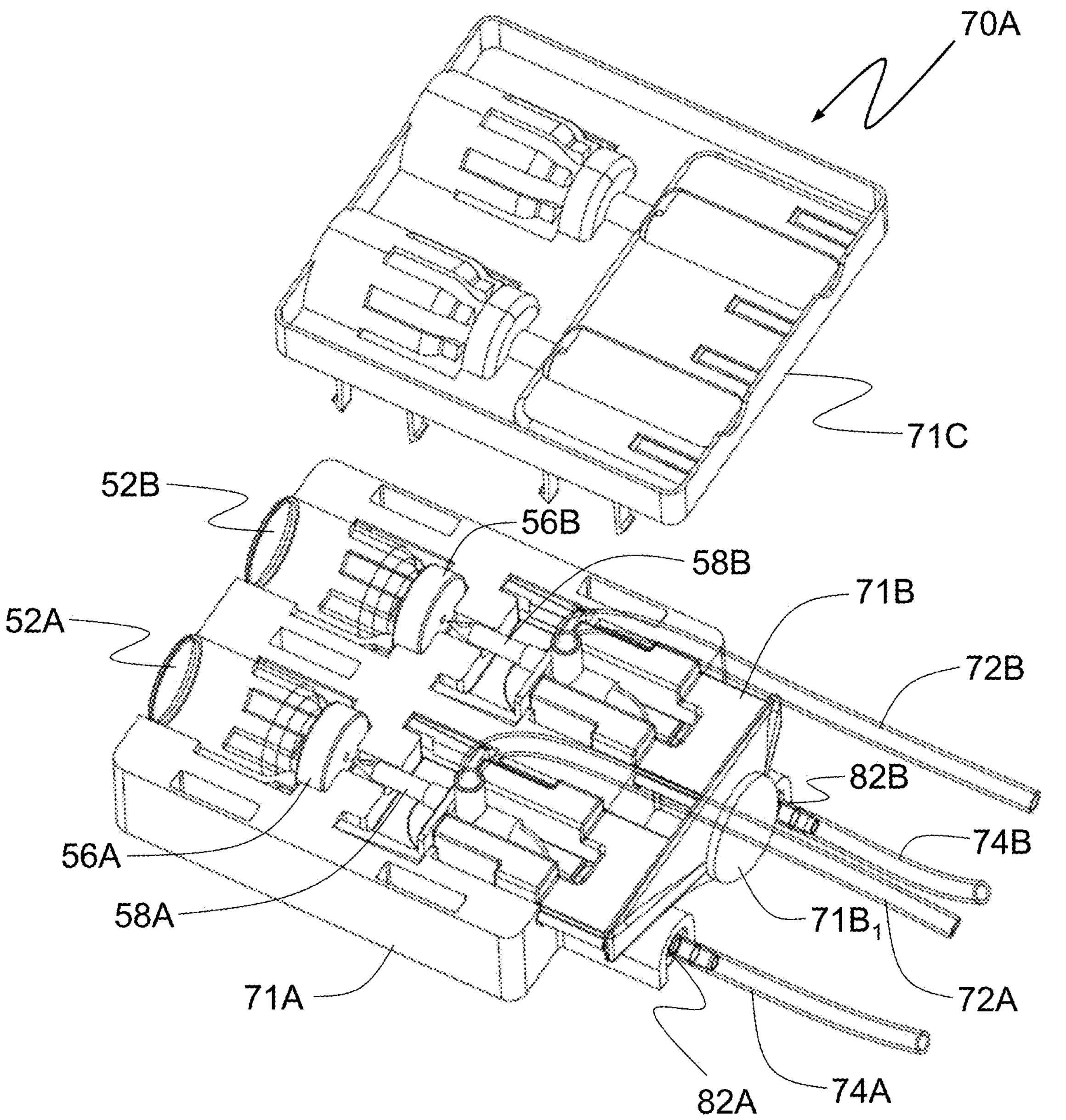
FIG. 7 is a perspective view of the components of the system shown in FIG. 5 sealed inside the sterilized pouch.

FIG. 7 is a perspective view of the portion of the exemplary system 150 that is hermetically sealed in the sterilized pouch 68, including the sterilized holder 70A, which comprises a base 71A, a press structure 71B that is fitted into first pair of slots at one end of the base 71A, and a cover 71C, the piercing members 56A, 56B attached to the press structure 71B and disposed in the first two slots, the inlet and outlet lines 72A, 72B, 74A, 74B connected to the piercing members 58A, 58B, the check valves 82A, 82B, and the sterilized vials 52A, 52B fitted into second pair of slots at the opposite end of the base 71A, with the sterilized septa 56A, 56B aligned to the piercing members 58A, 58B, respectively. The cover 71C of the sterilized holder 70A may be attached to the base 71A of the sterilized holder 70A to secure the sterilized vials 52A, 52B, the press structure 71B, and the piercing members 58A, 58B between the base 71A and cover 71C. At the time of use, a knob structure 71B1 at one end of the press structure 71B may be manually pushed towards the sterilized vials 52A, 52B from outside of the sterilized pouch 68, thereby puncturing through the sterilized septa 56A, 56B by the piercing members 58A, 58B and establishing fluidic connections between the sterilized vials 52A, 52B and the inlet and outlet lines 72A, 72B, 74A, 74B.

Operation of the system 150 for aseptically transferring the liquid substances in the sterilized vials 52A, 52B to a receiving container will now be described with reference to FIGS. 5 and 7. The free end of the integrated outlet line 74C may be aseptically connected to another line fluidically connected to the receiving container (not shown) by a commercial tube welder. The press structure 71B may be manually pushed towards the sterilized vials 52A, 52B from outside of the sterilized pouch 68 to punctuate through the sterilized septa 56A, 56B by the piercing members 58A, 58B, thereby establishing aseptic fluidic connections between the sterilized vials 52A, 52B and the inlet and outlet lines 72A, 72B, 74A, 74B, 74C. With the sterilized vials 52A, 52B hanged upside down and the pinch valve 154A released, the plunger of the syringe 66A is pushed to inject air through the inlet line 72A into the sterilized vial 52A, thereby pushing the liquid substance therein through the outlet line 74A and the integrated outlet line 74C and into the receiving container. Similarly, the liquid substance in the vial 52B flows through the outlet line 74B and the integrated outlet line 74C and into the receiving container in response to air injected from the syringe 66B into the sterilized vial 52B.

Figure 8:
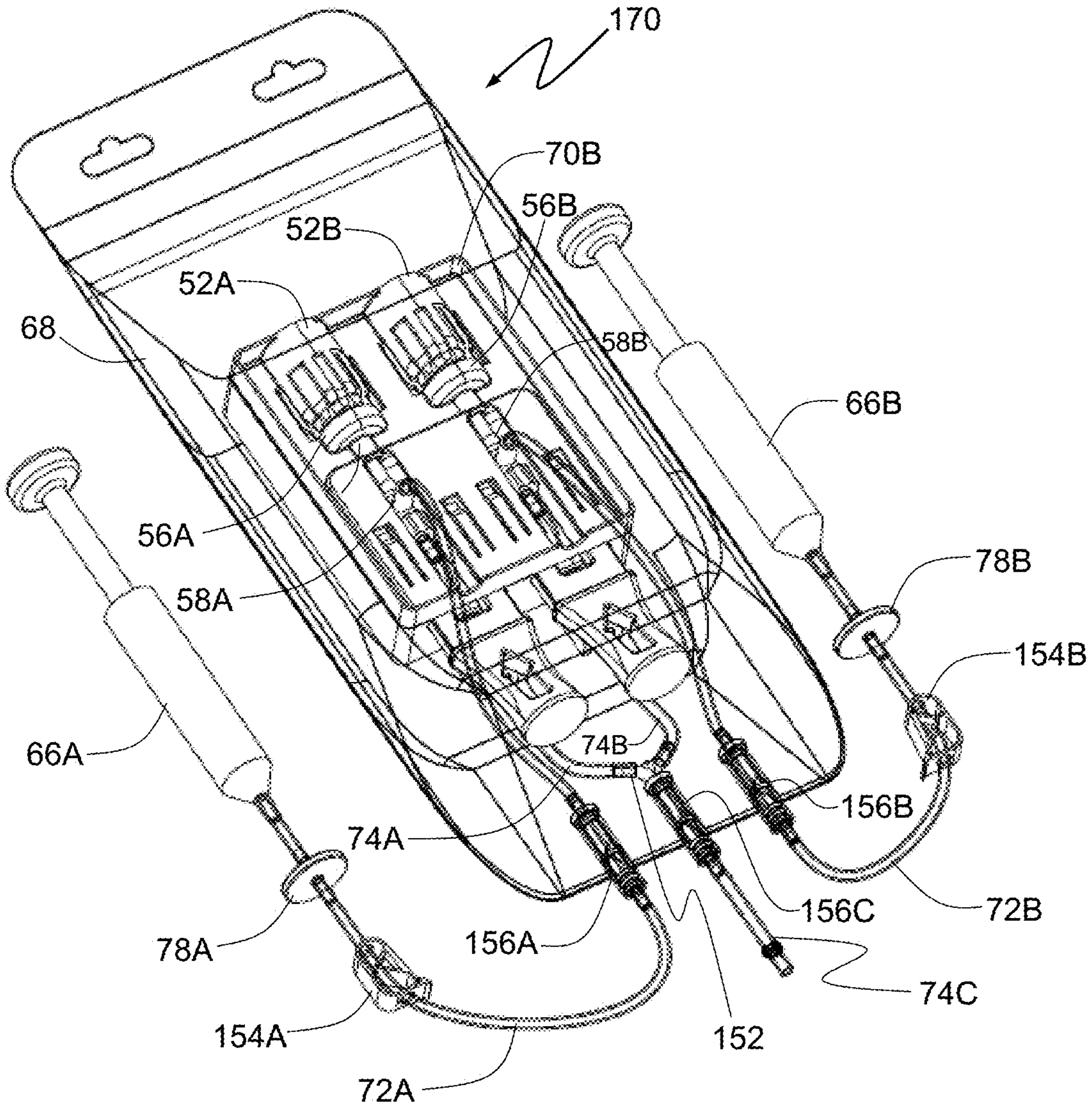
FIG. 8 is a perspective view of another exemplary system for aseptically transferring two liquid substances from a pair of sterilized vials to a receiving container in accordance with an embodiment of the present invention.

FIG. 8 is a perspective view of another exemplary system 170 for aseptically transferring up to two fluid substances from two vials in accordance with an embodiment of the present invention. The system 170 comprises a pair of sterilized vials 52A, 52B filled with respective liquid substances and sealed with sterilized septa 56A, 56B, a sterilized fluidic assembly, a sterilized holder 70B, and a sterilized pouch 68. The system 170 differs from the system 150 of FIG. 5 in that the holder 70B allows the piercing members 58A, 58B to be independently actuated.

The sterilized fluidic assembly comprises a pair of piercing members 58A, 58B, each of which includes therein a first channel 60A, 60B and a second channel 62A, 62B and having a tip end 64A, 64B that can operably puncture through the sterilized septum 56A, 56B, as shown in FIG. 6. The first channel 60A, 60B and the second channel 62A, 62B have the first and second channel openings at the tip end 64A, 64B of the piercing member 58A, 58B.

Referring back to FIG. 8, the sterilized fluidic assembly further comprises a pair of manual air pumps 66A, 66B in the form of syringes, a pair of inlet lines 72A, 72B that connect the syringes 66A, 66B to the piercing members 58A, 58B through a pair of pass-through connectors 156A, 156B, and a pair of outlet lines 74A, 74B fluidically connected to the second channels of the piercing member 56A, 56B at one end and an integrated outlet line 74C at the other end through a three-way connector 152 and a pass-through connector 156C. The free end of the integrated outlet line 74C may be hermetically sealed by heat-induced welding. The inlet lines 72A, 72B include in-line air filters 78A, 78B for filtering air expelled from the syringes 66A, 66B and clamps or pinch valves 154A, 154B for regulating the air flow through the inlet lines 72A, 72B. The outlet lines 74A, 74B optionally include check valves 82A, 82B that prevent the back flow of liquid substances.

The sterilized vials 52A, 52B, the sterilized holder 70B, and a part of the sterilized fluidic assembly including the piercing members 58A, 58B, the outlet lines 74A, 74B connected thereto, the check valves 82A, 82B, the three-way connector 152 connected to the outlet lines 74A, 74B, and portions of the inlet lines 72A, 72B are hermetically sealed inside the sterilized pouch 68 to preserve sterility. The inlet lines 72A, 72B fluidically connect the syringes 66A, 66B disposed outside the sterilized pouch 68 to the piercing members 58A, 58B disposed inside the sterilized pouch 68 via the pass-through connectors 156A, 156B. The three-way connector 152 disposed inside the sterilized pouch 68 is connected to one end of the pass-through connector 156C, the other end of which is connected to the integrated outlet line 74C disposed outside the sterilized pouch 68. The pass-through connectors 156A-156C may go through the sealed sterilized pouch 68 along a seam thereof.

Figure 9:
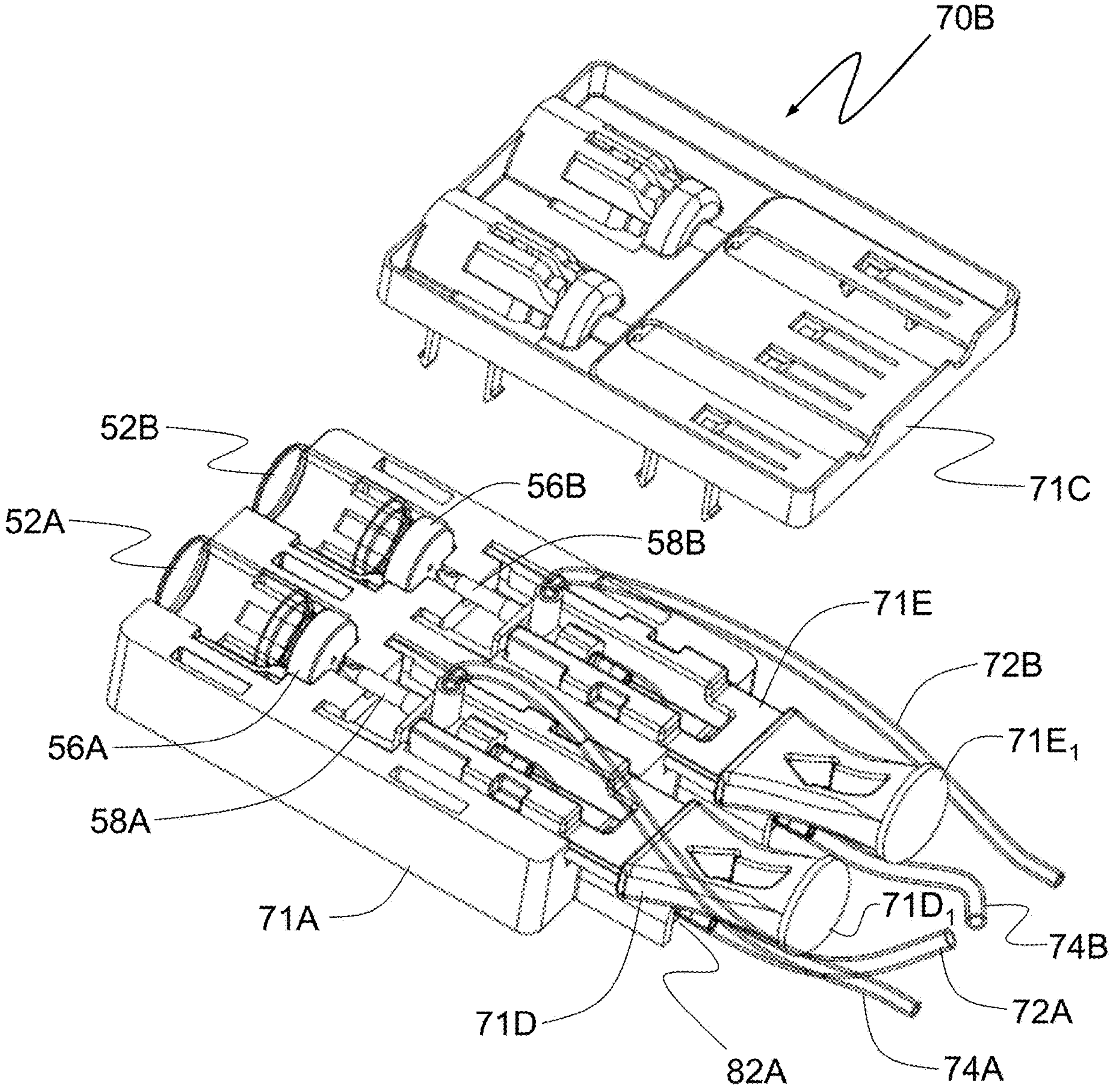
FIG. 9 is a perspective view of the components of the system shown in FIG. 8 sealed inside the sterilized pouch.

FIG. 9 is a perspective view of the portion of the exemplary system 170 that is hermetically sealed in the sterilized pouch 68, including the sterilized holder 70B, which comprises a base 71A, first and second press structures 71D, 71E that are fitted into first pair of slots at one end of the base 71A, and a cover 71C, the piercing members 56A, 56B attached to the press structures 71D, 71E and disposed in the first two slots, the inlet and outlet lines 72A, 72B, 74A, 74B connected to the piercing members 58A, 58B, the check valves 82A, 82B, and the sterilized vials 52A, 52B fitted into second pair of slots at the opposite end of the base 71A, with the sterilized septa 56A, 56B aligned to the piercing members 58A, 58B, respectively. The cover 71C of the sterilized holder 70B may be attached to the base 71A of the sterilized holder 70B to secure the sterilized vials 52A, 52B, the press structures 70D, 70E, and the piercing members 58A, 58B between the base 71A and cover 71C. At the time of use, a knob structure 71D1 at one end of the first press structure 71D may be manually pushed towards the sterilized vial 52A from outside of the sterilized pouch 68, thereby puncturing through the sterilized septum 56A by the piercing members 58A and establishing fluidic connections between the sterilized vial 52A and the inlet and outlet lines 72A, 74A. Similarly, another knob structure 71E1 at one end of the second press structure 71E may be manually pushed towards the sterilized vial 52B from outside of the sterilized pouch 68, thereby puncturing through the sterilized septum 56B by the piercing members 58B and establishing fluidic connections between the sterilized vial 52B and the inlet and outlet lines 72B, 74B. The sterilized holder 70B with two press structures 70D, 70E allows independent actuation of the piercing members 58A, 58B.

Operation of the system 170 for aseptically transferring the liquid substances in the sterilized vials 52A, 52B to a receiving container will now be described with reference to FIGS. 8 and 9. The free end of the integrated outlet line 74C may be aseptically connected to another line fluidically connected to the receiving container (not shown) by a commercial tube welder. The first press structure 71D may be manually pushed towards the sterilized vial 52A from outside of the sterilized pouch 68 to punctuate through the sterilized septum 56A by the piercing member 58A, thereby establishing aseptic fluidic connections between the sterilized vial 52A and the inlet and outlet lines 72A, 74A, 74C. With the sterilized vial 52A hanged upside down and the pinch valve 154A released, the plunger of the syringe 66A is pushed to inject air through the inlet line 72A into the sterilized vial 52A, thereby pushing the liquid substance therein through the outlet line 74A and the integrated outlet line 74C and into the receiving container. Similarly, the second press structure 71E may be manually pushed towards the sterilized vial 52B from outside of the sterilized pouch 68 to punctuate through the sterilized septum 56B by the piercing member 58B, thereby establishing aseptic fluidic connections between the sterilized vial 52B and the inlet and outlet lines 72B, 74B, 74C. With the sterilized vial 52B hanged upside down and the pinch valve 154B released, the plunger of the syringe 66B is pushed to inject air through the inlet line 72B into the sterilized vial 52B, thereby pushing the liquid substance therein through the outlet line 74B and the integrated outlet line 74C and into the receiving container.

Figure 10:
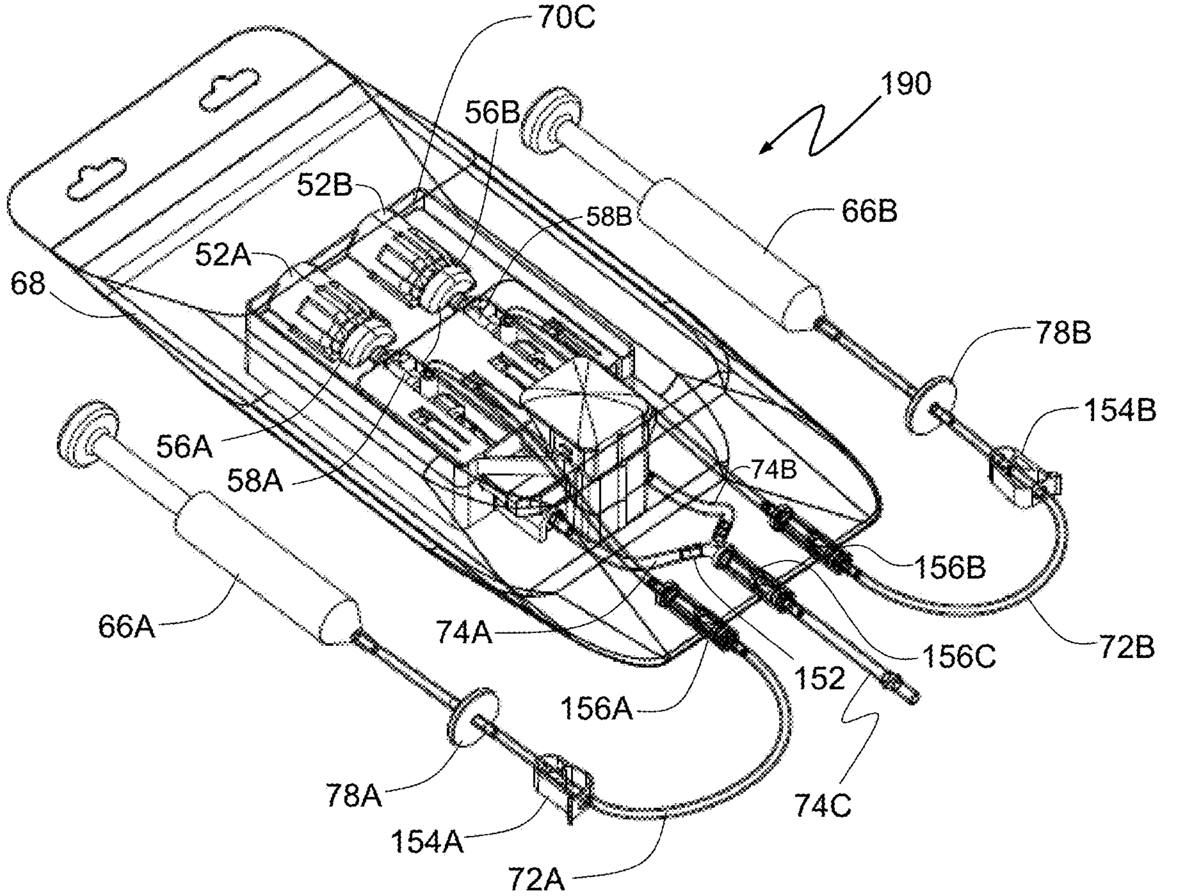
FIG. 10 is a perspective view of still another exemplary system for aseptically transferring two liquid substances from a pair of sterilized vials to a receiving container in accordance with an embodiment of the present invention.

FIG. 10 is a perspective view of still another exemplary system 190 for aseptically transferring up to two fluid substances from two vials in accordance with an embodiment of the present invention. The system 190 comprises a pair of sterilized vials 52A, 52B filled with respective liquid substances and sealed with sterilized septa 56A, 56B, a sterilized fluidic assembly, a sterilized holder 70C, and a sterilized pouch 68. The system 190 differs from the system 150 of FIG. 5 in that the holder 70C has a different mechanism for actuating the piercing members 58A, 58B for puncturing the sterilized septa 56A, 56B.

The sterilized fluidic assembly comprises a pair of piercing members 58A, 58B, each of which includes therein a first channel 60A, 60B and a second channel 62A, 62B and having a tip end 64A, 64B that can operably puncture through the sterilized septum 56A, 56B, as shown in FIG. 6. The first channel 60A, 60B and the second channel 62A, 62B have the first and second channel openings at the tip end 64A, 64B of the piercing member 58A, 58B.

Referring back to FIG. 10, the sterilized fluidic assembly further comprises a pair of manual air pumps 66A, 66B in the form of syringes, a pair of inlet lines 72A, 72B that connect the syringes 66A, 66B to the piercing members 58A, 58B through a pair of pass-through connectors 156A, 156B, and a pair of outlet lines 74A, 74B fluidically connected to the second channels of the piercing member 56A, 56B at one end and an integrated outlet line 74C at the other end through a three-way connector 152 and a pass-through connector 156C. The free end of the integrated outlet line 74C may be hermetically sealed by heat-induced welding. The inlet lines 72A, 72B include in-line air filters 78A, 78B for filtering air expelled from the syringes 66A, 66B and clamps or pinch valves 154A, 154B for regulating the air flow through the inlet lines 72A, 72B. The outlet lines 74A, 74B optionally include check valves 82A, 82B that prevent the back flow of liquid substances.

The sterilized vials 52A, 52B, the sterilized holder 70C, and a part of the sterilized fluidic assembly including the piercing members 58A, 58B, the outlet lines 74A, 74B connected thereto, the check valves 82A, 82B, the three-way connector 152 connected to the outlet lines 74A, 74B, and portions of the inlet lines 72A, 72B are hermetically sealed inside the sterilized pouch 68 to preserve sterility. The inlet lines 72A, 72B fluidically connect the syringes 66A, 66B disposed outside the sterilized pouch 68 to the piercing members 58A, 58B disposed inside the sterilized pouch 68 via the pass-through connectors 156A, 156B. The three-way connector 152 disposed inside the sterilized pouch 68 is connected to one end of the pass-through connector 156C, the other end of which is connected to the integrated outlet line 74C disposed outside the sterilized pouch 68. The pass-through connectors 156A-156C may go through the sealed sterilized pouch 68 along a seam thereof.

Figure 11:
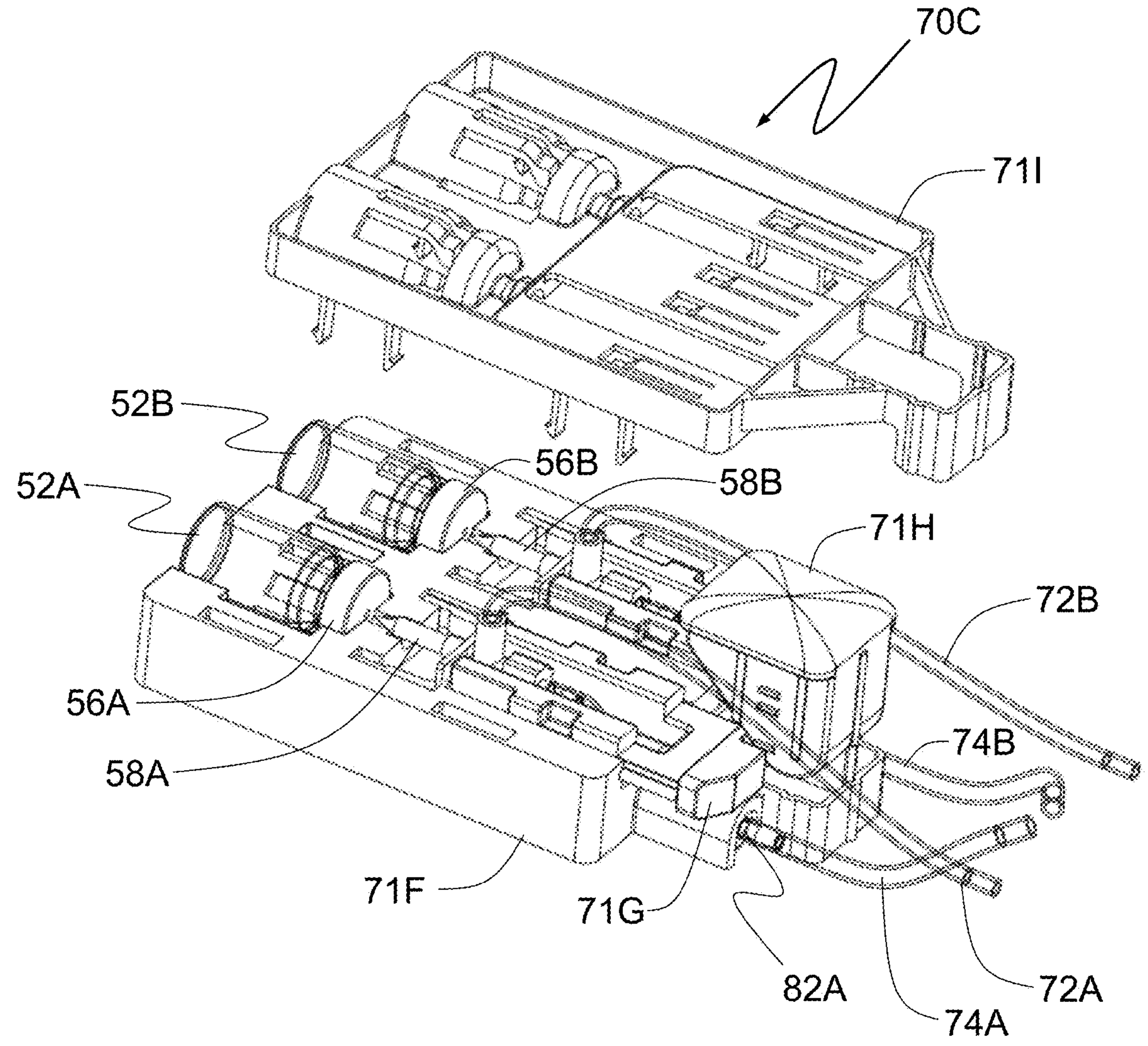
FIG. 11 is a perspective view of the components of the system shown in FIG. 10 sealed inside the sterilized pouch.
Figure 12A:
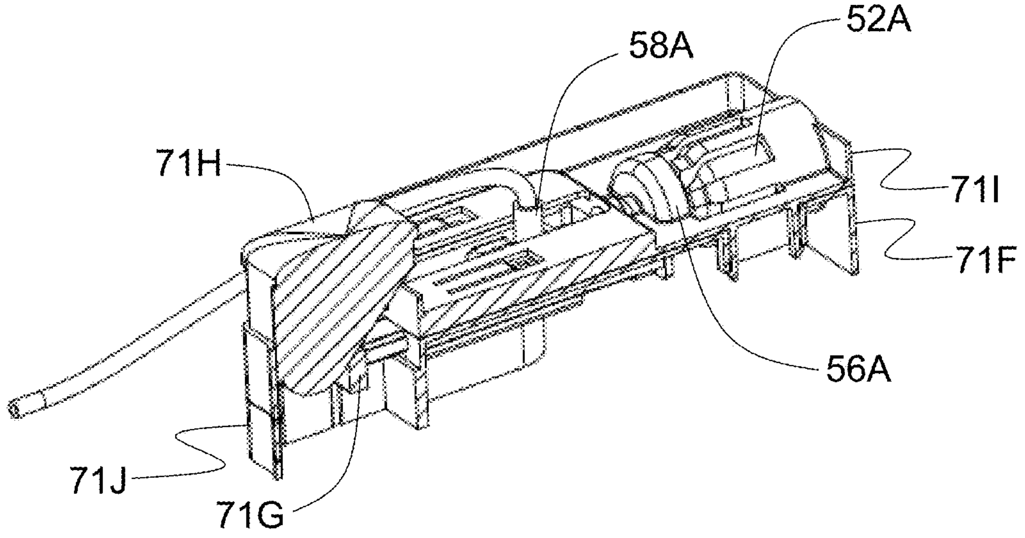
FIGS. 12A and 12B are section views illustrating operation of the holder of FIG. 11 for puncturing the septa.
Figure 12B:
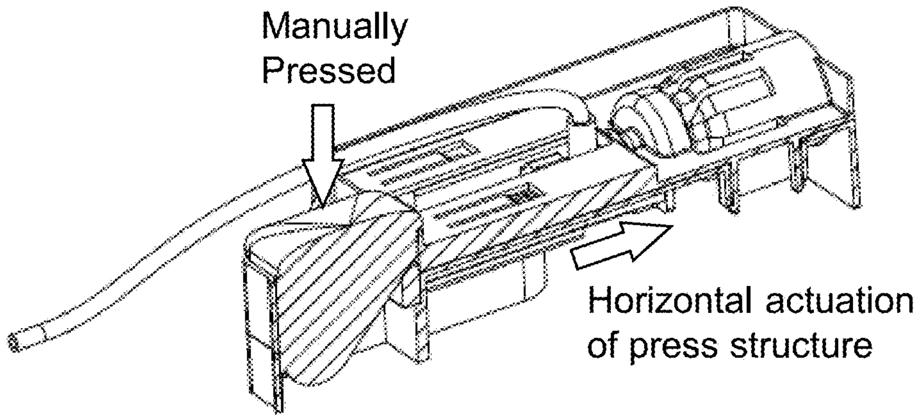

FIG. 11 is a perspective view of the portion of the exemplary system 190 that is hermetically sealed in the sterilized pouch 68, including the sterilized holder 70C, which comprises a base 71F, a press structure 71G that is fitted into first pair of slots at one end of the base 71F, a button or knob structure 71H for transmitting force to the press structure 71G, and a cover 711, the piercing members 56A, 56B attached to the press structure 71G and disposed in the first two slots, the inlet and outlet lines 72A, 72B, 74A, 74B connected to the piercing members 58A, 58B, and the sterilized vials 52A, 52B fitted into second pair of slots at the opposite end of the base 71F, with the sterilized septa 56A, 56B aligned to the piercing members 58A, 58B, respectively. The cover 711 of the sterilized holder 70C may be attached to the base 71F of the sterilized holder 70C to secure the sterilized vials 52A, 52B, the press structure 71G, and the piercing members 58A, 58B between the base 71F and cover 711. At the time of use, the press structure 71G may be manually pushed towards the sterilized vials 52A, 52B from outside of the sterilized pouch 68, thereby puncturing through the sterilized septa 56A, 56B by the piercing members 58A, 58B and establishing fluidic connections between the sterilized vials 52A, 52B and the inlet and outlet lines 72A, 72B, 74A, 74B. Alternatively, the section views of FIGS. 12A and 12B further show that at the time of use, the knob structure 71H, which has a slanted bottom, may be manually pushed downward into a sleeve 71J that partially surrounds the knob structure 71H, thereby exerting a horizontal force on the press structure 71G and the piercing members 58A, 58B attached thereto for puncturing through the sterilized septa 56A, 56B.

Operation of the system 190 for aseptically transferring the liquid substances in the sterilized vials 52A, 52B to a receiving container will now be described with reference to FIGS. 10-12. The free end of the integrated outlet line 74C may be aseptically connected to another line fluidically connected to the receiving container (not shown) by a commercial tube welder. The press structure 71G may be manually pushed towards the sterilized vials 52A, 52B from outside of the sterilized pouch 68 to punctuate through the sterilized septa 56A, 56B by the piercing members 58A, 58B, thereby establishing aseptic fluidic connections between the sterilized vials 52A, 52B and the inlet and outlet lines 72A, 72B, 74A, 74B, 74C. Alternatively, the piercing members 58A, 58B may be actuated to puncture through the sterilized septa 56A, 56B by pushing the knob structure 71H of the holder 70C downward into the sleeve 71. With the sterilized vials 52A, 52B hanged upside down and the pinch valve 154A released, the plunger of the syringe 66A is pushed to inject air through the inlet line 72A into the sterilized vial 52A, thereby pushing the liquid substance therein through the outlet line 74A and the integrated outlet line 74C and into the receiving container. Similarly, the liquid substance in the vial 52B flows through the outlet line 74B and the integrated outlet line 74C and into the receiving container in response to air injected from the syringe 66B into the sterilized vial 52B.

The present invention allows the aseptic transfer process described herein to be carried out in a non-aseptic or non-sterile environment because the sterilized vials 52, 52A, 52B and the piercing members 58, 58A, 58B are sealed in the sterilized pouch 68 and isolated from the environment. Fluidic connections can be made between the sterilized vials 52, 52A, 52B and the inlet and outlet lines 72, 72A, 72B, 74, 74A, 74B, 74C in the sterilized pouch 68 regardless of the surrounding environment.

While the present invention has been shown and described with reference to certain preferred embodiments, it is to be understood that those skilled in the art will no doubt devise certain alterations and modifications thereto which nevertheless include the true spirit and scope of the present invention. Thus the scope of the invention should be determined by the appended claims and their legal equivalents, rather than by examples given.

Any element in a claim that does not explicitly state "means for" performing a specified function, or "step for" performing a specific function, is not to be interpreted as a "means" or "step" clause as specified in 35 U.S.C. § 112, 16. In particular, the use of "step of" in the claims herein is not intended to invoke the provisions of 35 U.S.C. § 112, 6.

What is claimed is:

1. A system for aseptically transferring a liquid substance comprising:

a sterilized vial filled with the liquid substance and sealed with a sterilized septum;

a sterilized fluidic assembly comprising:

a piercing member including therein first and second channels and having a tip end that operably punctures the sterilized septum, the first and second channels having first and second channel openings at the tip end of the piercing member;

a manual air pump;

an inlet line fluidically connecting the manual air pump to the first channel of the piercing member; and an outlet line fluidically connected to the second channel of the piercing member at one end and hermetically sealed at the other end; and a sterilized pouch enclosing and hermetically sealing the sterilized vial and the piercing member and operably allowing the piercing member to puncture the sterilized septum without breaching the sterilized pouch when one of the sterilized vial and the piercing member is manually pushed against the other one of the sterilized vial and the piercing member from an exterior of the sterilized pouch.

2. The system of claim 1 further comprising a sterilized holder, wherein the sterilized vial and the piercing member are separately mounted on the sterilized holder that provides a guiding mechanism for the piercing member to puncture the sterilized septum of the sterilized vial in the sterilized pouch without breaching the sterilized pouch.

3. The system of claim 2, wherein the sterilized holder, together with the sterilized vial and the piercing member, is hermetically sealed in the sterilized pouch.

4. The system of claim 1, wherein the manual air pump comprises a syringe.

5. The system of claim 4, wherein the syringe contains sufficient air to propel all of the liquid substance out of the sterilized vial.

6. The system of claim 1, wherein the fluidic assembly further comprises an air filter for filtering air discharged from the manual air pump.

7. The system of claim 1, wherein the fluidic assembly further comprises a check valve connected to the outlet line for preventing back flow of the liquid substance into the sterilized vial.

8. The system of claim 1, wherein the fluidic assembly further comprises a pinch valve for regulating air flow in the inlet line.

9. The system of claim 1, wherein the other end of the outlet line is hermetically sealed with a male or female portion of an aseptic connector.

10. The system of claim 1, wherein the liquid substance comprises magnetic beads.

11. A method of manufacturing a system for aseptically transferring a liquid substance comprising the steps of:

sterilizing a vial and a septum;

aseptically filling the sterilized vial with the liquid substance and sealing the sterilized vial with the sterilized septum;

providing a fluidic assembly that includes:

a piercing member including therein first and second channels and having a tip end that operably punctures the sterilized septum, the first and second channels having first and second channel openings at the tip end of the piercing member;

a manual air pump;

an inlet line fluidically connecting the manual air pump to the first channel of the piercing member; and an outlet line fluidically connected to the second channel of the piercing member at one end and hermetically sealed at the other end;

sterilizing the fluidic assembly; and assembling the vial and the fluidic assembly and hermetically sealing the vial and the piercing member in a sterilized pouch in an aseptic environment, wherein the sterilized pouch allows the piercing member to puncture the sterilized septum without breaching the sterilized pouch when one of the sterilized vial and the piercing member is manually pushed against the other one of the sterilized vial and the piercing member from an exterior of the sterilized pouch.

12. The method of claim 11, wherein the sterilized vial and the piercing member are separately mounted on a sterilized holder that provides a guiding mechanism for the piercing member to puncture the sterilized septum of the sterilized vial in the sterilized pouch.

13. The method of claim 12, wherein the sterilized holder, together with the sterilized vial and the piercing member, is hermetically sealed in the sterilized pouch.

14. The method of claim 11, wherein the manual air pump is a syringe.

15. The method of claim 11, wherein the liquid substance comprises magnetic beads.

16. A method for aseptically transferring a liquid substance comprising the steps of:

providing a transfer system including:

a sterilized vial filled with the liquid substance and sealed with a sterilized septum;

a sterilized fluidic assembly comprising:

a piercing member including therein first and second channels and having a tip end that operably punctures the sterilized septum, the first and second channels having first and second channel openings at the tip end of the piercing member;

a manual air pump filled with sufficient air to propel all of the liquid substance out of the sterilized vial;

an inlet line fluidically connecting the manual air pump to the first channel of the piercing member; and an outlet line fluidically connected to the second channel of the piercing member at one end and hermetically sealed at the other end; and a sterilized pouch enclosing and hermetically sealing the sterilized vial and the piercing member;

aseptically connecting the outlet line to an external line for receiving the liquid substance;

puncturing the sterilized septum with the piercing member by manually pushing one of the sterilized vial and the piercing member against the other one of the sterilized vial and the piercing member from an exterior of the sterilized pouch without breaching the sterilized pouch, thereby aseptically establishing fluidic connections between the sterilized vial and the inlet and outlet lines; and expelling air from the manual air pump into the sterilized vial disposed in an inverted orientation to propel the liquid substance in the sterilized vial through the outlet line and into the external line.

17. The method of claim 16, wherein the sterilized vial and the piercing member are separately mounted on a sterilized holder that provides a guiding mechanism for the piercing member to puncture the sterilized septum in the sterilized pouch.

18. The method of claim 17, wherein the sterilized holder, together with the sterilized vial and the piercing member, is hermetically sealed in the sterilized pouch.

19. The method of claim 16, wherein the manual air pump is a syringe.

20. The method of claim 16, wherein the liquid substance comprises magnetic beads.

* * * * *